(12) United States Patent
Baudendistel et al.

(10) Patent No.: US 7,104,137 B2
(45) Date of Patent: Sep. 12, 2006

(54) MAGNETOSTRICTIVE FLUID-PRESSURE SENSOR

(75) Inventors: Thomas A. Baudendistel, Farmersville, OH (US); Harald Klode, Centerville, OH (US); Donald T. Morelli, White Lake, MI (US); Bruno P. B. Lequesne, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 79 days.

(21) Appl. No.: 10/827,803

(22) Filed: Apr. 20, 2004

(65) Prior Publication Data

US 2005/0229712 A1 Oct. 20, 2005

(51) Int. Cl.
G01L 9/16 (2006.01)

(52) U.S. Cl. ........................................................ 73/722

(58) Field of Classification Search ............. 73/861.42, 73/861.08, 861.11, 722; 336/20
See application file for complete search history.

(56) References Cited

U.S. PATENT DOCUMENTS

| 3,230,777 | A | * | 1/1966 | Chass ....................... 73/514.31 |
| 4,096,735 | A | | 6/1978 | Huntzinger et al. |
| 4,161,665 | A | | 7/1979 | Buck et al. |
| 4,403,514 | A | * | 9/1983 | Osborn ..................... 73/861.52 |
| 4,785,671 | A | | 11/1988 | Wakamiya et al. |
| 4,802,368 | A | | 2/1989 | Nordvall |
| 4,823,621 | A | * | 4/1989 | Sobel et al. ............. 73/862.69 |
| 4,825,709 | A | | 5/1989 | Nordvall |
| 5,165,284 | A | | 11/1992 | Shoji et al. |
| 5,303,595 | A | | 4/1994 | Shoji et al. |
| 5,385,055 | A | * | 1/1995 | Kubota et al. ........... 73/861.12 |
| 5,437,197 | A | | 8/1995 | Uras et al. |
| 5,449,418 | A | | 9/1995 | Takagi et al. |
| 5,502,381 | A | | 3/1996 | Saitou |
| 5,565,632 | A | | 10/1996 | Ogawa |
| 5,672,812 | A | | 9/1997 | Meyer |
| 5,747,696 | A | | 5/1998 | Kwun et al. |
| 5,751,535 | A | * | 5/1998 | Garcia-Gutierrez et al. 361/143 |
| 5,905,210 | A | | 5/1999 | O'Boyle et al. |
| RE36,427 | E | | 12/1999 | Gioutsos |
| 6,026,847 | A | * | 2/2000 | Reinicke et al. ......... 137/487.5 |
| 6,119,667 | A | | 9/2000 | Boyer et al. |
| 6,269,530 | B1 | * | 8/2001 | Armitage et al. .......... 29/602.1 |
| 6,345,544 | B1 | | 2/2002 | Mizuno et al. |
| 6,363,793 | B1 | | 4/2002 | O'Boyle |
| 6,389,911 | B1 | * | 5/2002 | Aoki ....................... 73/862.69 |
| 6,407,660 | B1 | | 6/2002 | Bomya |

(Continued)

FOREIGN PATENT DOCUMENTS

EP 0 371 244 A2 6/1990

(Continued)

*Primary Examiner*—Edward Lefkowitz
*Assistant Examiner*—George P Bonanto
(74) *Attorney, Agent, or Firm*—Jimmy L. Funke

(57) ABSTRACT

A magnetostrictive fluid-pressure sensor includes annular inner and outer cylinders, a first connector, annular second and third connectors, and first and second coils. The inner cylinder surrounds a fluid-receiving bore. At least one of the cylinders is a magnetostrictive cylinder. The first connector connects the first ends of the cylinders and has a first portion extending radially inward of the inner cylinder. The second connector connects the second ends of the cylinders and defines a fluid inlet. The third connector connects the cylinders and is positioned longitudinally between the first and second connectors. The first coil is positioned radially between the inner and outer cylinders and longitudinally between the first and third connectors. The second coil is positioned radially between the inner and outer cylinders and longitudinally between the second and third connectors.

20 Claims, 2 Drawing Sheets

U.S. PATENT DOCUMENTS

| | | |
|---|---|---|
| 6,460,381 B1 | 10/2002 | Yoshida et al. |
| 6,586,926 B1 | 7/2003 | Bomya |
| 6,595,069 B1 * | 7/2003 | Frey et al. ............... 73/861.11 |
| 6,622,577 B1 | 9/2003 | Uras |
| 6,631,776 B1 | 10/2003 | Bomya |
| 6,658,720 B1 * | 12/2003 | Frey et al. .................... 29/593 |
| 6,972,560 B1 * | 12/2005 | Baudendistel et al. ...... 324/209 |
| 2002/0121127 A1 | 9/2002 | Kiess et al. |
| 2002/0189334 A1 | 12/2002 | Ford et al. |
| 2004/0093951 A1 * | 5/2004 | Viola et al. ................... 73/728 |
| 2004/0107777 A1 * | 6/2004 | Lequesne et al. ............. 73/779 |
| 2005/0207600 A1 * | 9/2005 | Mori et al. ................. 381/152 |

FOREIGN PATENT DOCUMENTS

| | | |
|---|---|---|
| EP | 0 450 933 A1 | 10/1991 |
| EP | 0 567 056 A1 | 10/1993 |
| EP | 0 615 118 A1 | 9/1994 |
| JP | 62-218833 | 9/1987 |
| WO | 93/04349 | 3/1993 |

* cited by examiner

MAGNETOSTRICTIVE FLUID-PRESSURE SENSOR

TECHNICAL FIELD

The present invention relates generally to pressure sensors, and more particularly to a magnetostrictive fluid-pressure sensor.

BACKGROUND OF THE INVENTION

Conventional magnetostrictive fluid-pressure sensors include a fluid-pressure sensor which blocks a fluid flow and has an annular magnetostrictive cylinder with a lower deformable section below the fluid block surrounding the fluid and with an upper non-deformable section above the fluid block surrounding a hollow cavity. A first coil surrounds the upper section and provides a reference inductance value. A second coil surrounds the lower section and provides an inductance value corresponding to the change in permeability of the lower section caused by the pressure of the fluid against the fluid block which strains the lower section of the magnetostrictive cylinder changing its permeability. An annular air space separates the coil bobbin from the magnetostrictive cylinder, wherein the coil bobbin contains the first and second coils.

Another conventional fluid-pressure sensor is an automotive spark plug, which includes a single coil surrounding a magnetostrictive collar whose inner surface is exposed to stress waves from an internal combustion engine cylinder.

What is needed is an improved magnetostrictive fluid-pressure sensor.

SUMMARY OF THE INVENTION

In a first expression of a first embodiment of the invention, a magnetostrictive fluid-pressure sensor includes annular inner and outer cylinders, a first connector, annular second and third connectors, and first and second coils. The annular inner cylinder has a longitudinal axis, surrounds a fluid-receiving bore, and has first and second ends. The annular outer cylinder is substantially coaxially aligned with the inner cylinder, is spaced radially outward from the inner cylinder, and has first and second ends. At least one of the inner and outer cylinders is a magnetostrictive cylinder. The first connector connects the first ends of the inner and outer cylinders and has a first portion extending radially inward of the inner cylinder. The annular second connector connects the second ends of the inner and outer cylinders and surrounds a fluid inlet of the bore. The annular third connector connects the inner and outer cylinders and is positioned longitudinally between the first and second connectors. The first coil is positioned radially between the inner and outer cylinders and longitudinally between the first and third connectors and is substantially coaxially aligned with the longitudinal axis. The first coil when activated generates a solid first magnetic flux circuit in connecting portions of the inner and outer cylinders and the first and third connectors. The second coil is positioned radially between the inner and outer cylinders and longitudinally between the second and third connectors and is substantially coaxially aligned with the longitudinal axis. The second coil when activated generates a solid second magnetic flux circuit in connecting portions of the inner and outer cylinders and the second and third connectors which is opposite in flux direction to the first magnetic flux circuit.

Several benefits and advantages are derived from the first expression of the first embodiment of the invention. By using two coils which generate opposite magnetic flux in a magnetostrictive cylinder undergoing longitudinal strain from fluid pressure, the two coils together substantially cancel out electromagnetic interference resulting in a more accurate measurement of permeability from which the fluid pressure can be determined. By providing solid magnetic flux circuits (which include different portions of a magnetostrictive cylinder undergoing longitudinal strain from fluid pressure) around each coil, signal strength is improved over conventional fluid-pressure-determining magnetic flux circuits which employ air spaces to complete the magnetic flux circuit. In one example, having the first portion of the first connector seal the first end of the cylinder allows the sensor to be used to measure fluid pressure at the end of a fluid conduit. In another example, having the first portion of the first connector surround a fluid outlet allows the sensor to be used as an in-line fluid-pressure sensor.

DESCRIPTION OF THE PREFERRED EMBODIMENT

Figure 1:
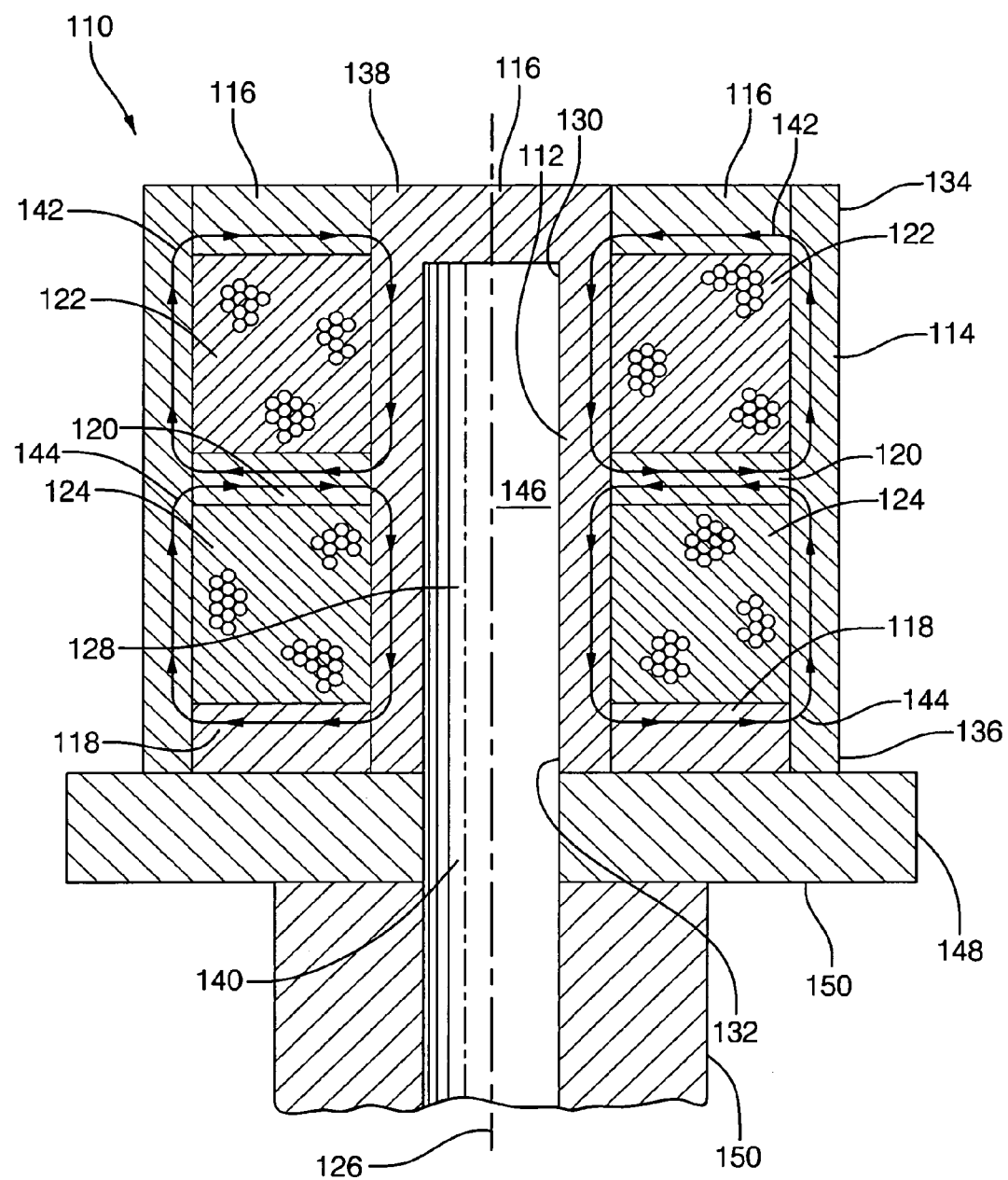
FIG. 1 is a longitudinal cross-sectional schematic view of a portion of a first embodiment of a magnetostrictive fluid-pressure sensor of the invention which is used, in one employment, at the end of a fluid conduit.

Referring now to the drawing, FIG. 1 shows a first embodiment of the present invention. A first expression of the embodiment of FIG. 1 is for a magnetostrictive fluid-pressure sensor 110 including an annular inner cylinder 112, an annular outer cylinder 114, a first connector 116, an annular second connector 118, an annular third connector 120, a first coil 122, and a second coil 124. The inner cylinder 112 has a longitudinal axis 126, surrounds a fluid-receiving bore 128, and has first and second ends 130 and 132. The outer cylinder 114 is substantially coaxially aligned with the inner cylinder 112, is spaced radially outward from the inner cylinder 112, and has first and second ends 134 and 136. At least one of the inner and outer cylinders 112 and 114 is a magnetostrictive cylinder. The first connector 116 connects the first ends 130 and 134 of the inner and outer cylinders 112 and 114 and has a first portion 138 extending radially inward of the inner cylinder 112. The second connector 118 connects the second ends 132 and 136 of the inner and outer cylinders 112 and 114 and surrounds a fluid inlet 140 of the bore 128. The third connector 120 connects the inner and outer cylinders 112 and 114 and is disposed longitudinally between the first and second connectors 116 and 118. The first coil 122 is disposed radially between the inner and outer cylinders 112 and 114 and longitudinally between the first and third connectors 116 and 120 and is substantially coaxially aligned with the longitudinal axis 126. The first coil 122 when activated generates a solid first magnetic flux circuit 142 (shown as a loop having arrowheads indicating the direction of the magnetic flux) in connecting portions of the inner and outer cylinders 112 and 114 and the first and third connectors 116 and 120. The second coil 124 is disposed radially between the inner and outer cylinders 112 and 114 and longitudinally between the second and third connectors 118 and 120 and is substantially coaxially aligned with the longitudinal axis 126. The second coil 124 when activated generates a solid second magnetic flux circuit 144 (shown as a loop having arrowheads indicating the direction of the magnetic flux) in connecting portions of the inner and outer cylinders 112 and 114 and the second and third connectors 118 and 120 which is opposite in flux direction to the first magnetic flux circuit 142.

It is noted that a magnetic flux circuit that includes an air space to define a magnetic flux circuit is not a solid magnetic flux circuit.

In one construction of the first expression of the first embodiment of FIG. 1, various combinations of cylinders and connectors are portions of monolithic subassemblies. For example, in FIG. 1 the inner cylinder 112 and the first portion 138 of the first connector 116 are portions of a monolithic subassembly. In the same or a different construction, a member includes two or more segments. For example, in FIG. 1 the first connector 116 includes an annular segment and a central circular segment. Other constructions are left to the artisan.

A first method for measuring the pressure of a fluid 146 using the above-described magnetostrictive fluid-pressure sensor 110 includes steps a) through c). Step a) includes exposing the fluid inlet 140 to the fluid 146 wherein the fluid 146 enters the bore 128 and contacts the first portion 138 of the first connector 116. Step b) includes measuring the inductance of the first and second coils 122 and 124. Step c) includes determining the pressure of the fluid 146 using at least the measured inductance of the first and second coils 122 and 124.

It is noted that step b) can be carried out by using one of the inductance measuring methods known to those skilled in the art. In one variation of the first method, step b) compensates for any difference in the first and second numbers of total turns of the coils 122 and 124 as is within the level of skill of the artisan. In the same or a different variation, step b) includes compensating for any temperature change over time as is also within the level of skill of the artisan.

In one enablement of the first method, the first coil 122 consists of a single first subcoil. In one variation, the second coil 124 consists of a single second subcoil coil. In one construction, the second number of total turns of the second coil 124 equals the first number of total turns of the first coil 122.

In one elaboration of the first method, the second coil 124 is connected in series to the first coil 122. In one variation, step b) includes measuring the total inductance between the unconnected ends of the first and second coils. In a different variation, step b) includes measuring a first inductance of the first coil, measuring a second inductance of the second coil and adding the two measurements. In a different elaboration of the first method, the second coil is not connected to the first coil.

In one variation of the first method, the electric current in the second coil is substantially equal to the electric current in the first coil. Step b) includes compensating for unequal electric currents as is within the level of skill of the artisan. In one modification, the electric current is alternating electric current. In one variation, the alternating electric current is a sinusoidally alternating electric current. Other types of alternating electric current are left to the artisan.

In one illustration of the first method, step d) includes comparing the measured inductance with previous inductances measured for known fluid pressures. Other illustrations of determining pressure from measured inductance are left to the artisan.

In one example of the first expression of the embodiment of FIG. 1, each of the inner and outer cylinders 112 and 114 is a magnetostrictive cylinder. In a different example, only the inner cylinder 112 is a magnetostrictive cylinder. In a further example, only the outer cylinder 114 is a magnetostrictive cylinder. In one variation, not shown, a magnetostrictive cylinder is a magnetostrictive layer attached to a cylindrical member.

In one implementation of the first expression of the first embodiment of FIG. 1, the first and second magnetic flux-circuits 142 and 144 each are essentially devoid of any joint air gaps. Joint air gaps are defined as gaps adjacent contacting surface portions of a solid joint between joined members and can occur with certain joining methods in connecting the cylinders and connectors. The term "joined" includes a first member being solidly trapped against, but not attached to, a second member such as being solidly trapped against and between second and third members.

In one enablement of the first expression of the first embodiment of FIG. 1, the first connector 116 defines a substantially complete barrier between the first ends 130 and 134 of the inner and outer cylinders 112 and 114. In one variation, the second connector 118 defines a substantially complete barrier between the second ends 132 and 136 of the inner and outer cylinders 112 and 114. In one modification, the third connector 120 defines a substantially complete barrier between the inner and outer cylinders 112 and 114.

In one deployment of the first expression of the first embodiment of FIG. 1, the second connector 118 is an end plate and, in one variation, is aligned substantially perpendicular to the longitudinal axis 126. In the same or a different deployment, the third connector 120 is a plate and, in one variation, is aligned substantially perpendicular to the longitudinal axis 126. In the same or a different deployment, the first connector 116 is an end plate and, in one variation, is aligned substantially perpendicular to the longitudinal axis 126.

A second expression of the first embodiment of FIG. 1 is for a magnetostrictive fluid-pressure sensor 110 including an annular inner cylinder 112, an annular outer cylinder 114, a first connector 116, an annular second connector 118, an annular third connector 120, a first coil 122, and a second coil 124. The inner cylinder 112 has a longitudinal axis 126, surrounds a fluid-receiving bore 128, and has first and second ends 130 and 132. The outer cylinder 114 is substantially coaxially aligned with the inner cylinder 112, is spaced radially outward from the inner cylinder 112, and has first and second ends 134 and 136. At least one of the inner and outer cylinders 112 and 114 is a magnetostrictive cylinder. The first connector 116 connects the first ends 130 and 134 of the inner and outer cylinders 112 and 114 and has a first portion 138 extending radially inward of the inner cylinder 112 and sealing the first end 130 of the inner cylinder 112. The second connector 118 connects the second ends 132 and 136 of the inner and outer cylinders 112 and 114 and surrounds a fluid inlet 140 of the bore 128. The third connector 120 connects the inner and outer cylinders 112 and 114 and is disposed longitudinally between the first and second connectors 116 and 118. The first coil 122 is disposed radially between the inner and outer cylinders 112 and 114 and longitudinally between the first and third connectors 116 and 120 and is substantially coaxially aligned with the longitudinal axis 126. The first coil 122 when activated generates a solid first magnetic flux circuit 142 in connecting portions of the inner and outer cylinders 112 and 114 and the first and third connectors 116 and 120. The second coil 124 is disposed radially between the inner and outer cylinders 112 and 114 and longitudinally between the second and third connectors 118 and 120 and is substantially coaxially aligned with the longitudinal axis 126. The second coil 124 when activated generates a solid second magnetic flux circuit 144 in connecting portions of the inner and outer cylinders 112 and 114 and the second and third connectors 118 and 120 which is opposite in flux direction to the first magnetic flux circuit 142.

The previously-described method, examples, etc. of the first expression of the first embodiment of FIG. 1 are equally applicable to the second expression of the first embodiment of FIG. 1. It is noted that the second expression of the first embodiment, as most broadly described, is the same as the first expression of the first embodiment, as most broadly described, with the added limitation that the first connector 116 seal the first end 130 of the inner cylinder 112. In one employment of the second expression of the first embodiment, the magnetostrictive fluid-pressure sensor 110 is used to measure fluid pressure at the end 148 of a fluid conduit 150.

Figure 2:
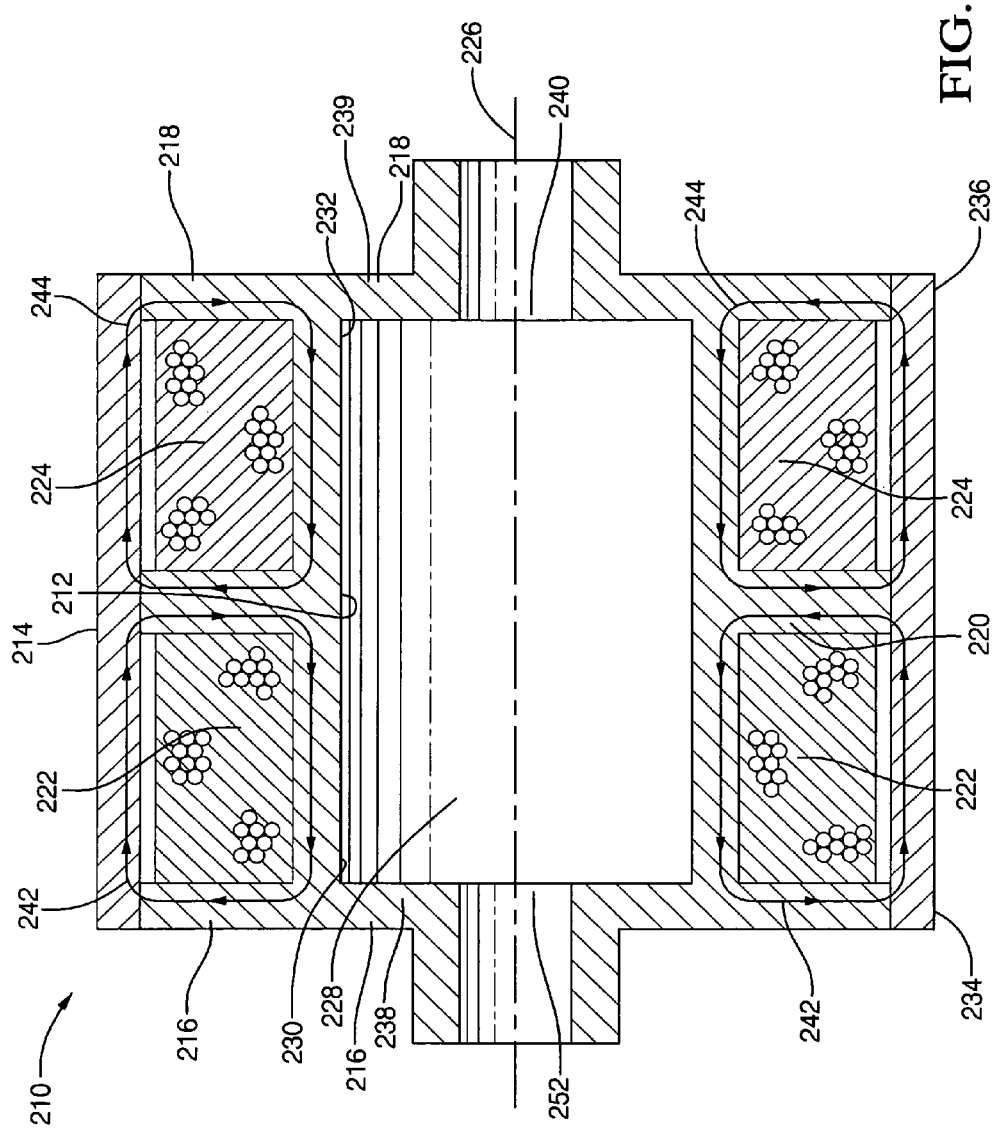
FIG. 2 is a longitudinal cross-sectional schematic view of a portion of a second embodiment of a magnetostrictive fluid-pressure sensor of the invention which is used, in one employment, as an in-line fluid-pressure sensor.

Referring again to the drawing, FIG. 2 shows a second embodiment of the present invention. A first expression of the embodiment of FIG. 2 is for a magnetostrictive fluid-pressure sensor 210 including an annular inner cylinder 212, an annular outer cylinder 214, an annular first connector 216, an annular second connector 218, an annular third connector 220, a first coil 222, and a second coil 224. The inner cylinder 212 has a longitudinal axis 226, surrounds a fluid-receiving bore 228, and has first and second ends 230 and 232. The outer cylinder 214 is substantially coaxially aligned with the inner cylinder 212, is spaced radially outward from the inner cylinder 212, and has first and second ends 234 and 236. At least one of the inner and outer cylinders 212 and 214 is a magnetostrictive cylinder. The first connector 216 connects the first ends 230 and 234 of the inner and outer cylinders 212 and 214 and has a first portion 238 extending radially inward of the inner cylinder 212 and surrounding a fluid outlet 252 of the bore 228. The second connector 218 connects the second ends 232 and 236 of the inner and outer cylinders 212 and 214 and has a second portion 239 extending radially inward of the inner cylinder 212 and surrounds a fluid inlet 240 of the bore 228. The third connector 220 connects the inner and outer cylinders 212 and 214 and is disposed longitudinally between the first and second connectors 216 and 218. The first coil 222 is disposed radially between the inner and outer cylinders 212 and 214 and longitudinally between the first and third connectors 216 and 220 and is substantially coaxially aligned with the longitudinal axis 226. The first coil 222 when activated generates a solid first magnetic flux circuit 242 in connecting portions of the inner and outer cylinders 212 and 214 and the first and third connectors 216 and 220. The second coil 224 is disposed radially between the inner and outer cylinders 212 and 214 and longitudinally between the second and third connectors 218 and 220 and is substantially coaxially aligned with the longitudinal axis 226. The second coil 224 when activated generates a solid second magnetic flux circuit 244 in connecting portions of the inner and outer cylinders 212 and 214 and the second and third connectors 218 and 220 which is opposite in flux direction to the first magnetic flux circuit 242.

The previously-described method, examples, etc. of the first expression of the first embodiment of FIG. 1 are equally applicable to the first expression of the second embodiment of FIG. 2. It is noted that the first expression of the second embodiment, as most broadly described, is the same as the first expression of the first embodiment, as most broadly described, with the added limitation that the first portion 238 of the first connector 216 surrounds a fluid outlet 252 of the bore 228 and that the second connector 218 have a second portion 239 which extends radially inward of the inner cylinder 212 and surrounds the fluid inlet 240. In one employment of the first expression of the second embodiment, the magnetostrictive fluid-pressure sensor 210 is used as an in-line fluid-pressure sensor.

It is noted that a broader expression of the second embodiment is the same as the most-broadly-described first expression of the first embodiment, as can be appreciated by the artisan.

Several benefits and advantages are derived from the first expression of the first embodiment of the invention. By using two coils which generate opposite magnetic flux in a magnetostrictive cylinder undergoing longitudinal strain from fluid pressure, the two coils together substantially cancel out electromagnetic interference resulting in a more accurate measurement of permeability from which the fluid pressure can be determined. By providing solid magnetic flux circuits (which include different portions of a magnetostrictive cylinder undergoing longitudinal strain from fluid pressure) around each coil, signal strength is improved over conventional fluid-pressure-determining magnetic flux circuits which employ air spaces to complete the magnetic flux circuit. In one example, having the first portion of the first connector seal the first end of the cylinder allows the sensor to be used to measure fluid pressure at the end of a fluid conduit. In another example, having the first portion of the first connector surround a fluid outlet allows the sensor to be used as an in-line fluid-pressure sensor.

The foregoing description of several expressions of embodiments and a method of the invention has been presented for purposes of illustration. It is not intended to be exhaustive or to limit the invention to the precise form and steps disclosed, and obviously many modifications and variations are possible in light of the above teaching. It is intended that the scope of the invention be defined by the claims appended hereto.

The invention claimed is:

1. A magnetostrictive fluid-pressure sensor comprising:
   a) an annular inner cylinder having a longitudinal axis, surrounding a fluid-receiving bore, and having first and second ends;
   b) an annular outer cylinder substantially coaxially aligned with the inner cylinder, spaced radially outward from the inner cylinder, and having first and second ends, wherein at least one of the inner and outer cylinders is a magnetostrictive cylinder;
   c) a first connector connecting the first ends of the inner and outer cylinders and having a first portion extending radially inward of the inner cylinder;
   d) an annular second connector connecting the second ends of the inner and outer cylinders and surrounding a fluid inlet of the bore;
   e) an annular third connector connecting the inner and outer cylinders and disposed longitudinally between the first and second connectors;
   f) a first coil surrounding the fluid-receiving bore, disposed radially between the inner and outer cylinders and longitudinally between the first and third connectors, and substantially coaxially aligned with the longitudinal axis, wherein the first coil when activated generates a solid first magnetic flux circuit in connecting portions of the inner and outer cylinders and the first and third connectors; and g) a second coil surrounding the fluid-receiving bore, disposed radially between the inner and outer cylinders and longitudinally between the second and third connectors, and substantially coaxially aligned with the longitudinal axis, wherein the second coil when activated generates a solid second magnetic flux circuit in connecting portions of the inner and outer cylinders and the second and third connectors, and wherein the second magnetic flux circuit is opposite in flux direction to the first magnetic flux circuit in the third connector.

2. A method for determining a pressure of a fluid using the magnetostrictive fluid-pressure sensor of claim 1, comprising the steps of:
   a) exposing the fluid inlet to the fluid wherein the fluid enters the bore and contacts the first portion of the first connector;
   b) measuring an inductance of the first and second coils; and
   c) determining the pressure of the fluid using at least the measured inductance of the first and second coils.

3. The magnetostrictive fluid-pressure sensor of claim 1, wherein each of the inner and outer cylinders is a magnetostrictive cylinder.

4. The magnetostrictive fluid-pressure sensor of claim 3, wherein the first and second magnetic flux circuits each are essentially devoid of any joint air gaps.

5. The magnetostrictive fluid-pressure sensor of claim 4, wherein the first connector defines a substantially complete barrier between the first ends of the inner and outer cylinders, wherein the second connector defines a substantially complete barrier between the second ends of the inner and outer cylinders, and wherein the third connector defines a substantially complete barrier between the inner and outer cylinders.

6. The magnetostrictive fluid-pressure sensor of claim 5, wherein the second connector is an end plate, and wherein the third connector is a plate.

7. The magnetostrictive fluid-pressure sensor of claim 6, wherein the first connector is an end plate.

8. A method for determining a pressure of a fluid using the magnetostrictive fluid-pressure sensor of claim 7, comprising the steps of:
   a) exposing the fluid inlet to the fluid wherein the fluid enters the bore and contacts the first portion of the first connector;
   b) measuring an inductance of the first and second coils; and
   c) determining the pressure of the fluid using at least the measured inductance of the first and second coils.

9. The magnetostrictive fluid-pressure sensor of claim 1, wherein the first and second magnetic flux circuits each are essentially devoid of any joint air gaps.

10. The magnetostrictive fluid-pressure sensor of claim 1, wherein the first connector defines a substantially complete barrier between the first ends of the inner and outer cylinders, wherein the second connector defines a substantially complete barrier between the second ends of the inner and outer cylinders, and wherein the third connector defines a substantially complete barrier between the inner and outer cylinders.

11. The magnetostrictive fluid-pressure sensor of claim 1, wherein the second connector is an end plate, and wherein the third connector is a plate.

12. The magnetostrictive fluid-pressure sensor of claim 1, wherein the first connector is an end plate.

13. A magnetostrictive fluid-pressure sensor comprising:
   a) an annular inner cylinder having a longitudinal axis, surrounding a fluid-receiving bore, and having first and second ends;
   b) an annular outer cylinder substantially coaxially aligned with the inner cylinder, spaced radially outward from the inner cylinder, and having first and second ends, wherein at least one of the inner and outer cylinders is a magnetostrictive cylinder;
   c) a first connector connecting the first ends of the inner and outer cylinders and having a first portion extending radially inward of the inner cylinder and sealing the first end of the inner cylinder;
   d) an annular second connector connecting the second ends of the inner and outer cylinders and surrounding a fluid inlet of the bore;
   e) an annular third connector connecting the inner and outer cylinders and disposed longitudinally between the first and second connectors;
   f) a first coil surrounding the fluid-receiving bore, disposed radially between the inner and outer cylinders and longitudinally between the first and third connectors, and substantially coaxially aligned with the longitudinal axis, wherein the first coil when activated generates a solid first magnetic flux circuit in connecting portions of the inner and outer cylinders and the first and third connectors; and
   g) a second coil surrounding the fluid-receiving bore, disposed radially between the inner and outer cylinders and longitudinally between the second and third connectors, and substantially coaxially aligned with the longitudinal axis, wherein the second coil when activated generates a solid second magnetic flux circuit in connecting portions of the inner and outer cylinders and the second and third connectors, and wherein the second magnetic flux circuit is opposite in flux direction to the first magnetic flux circuit in the third connector.

14. The magnetostrictive fluid-pressure sensor of claim 13, wherein the first connector defines a substantially complete barrier between the first ends of the inner and outer cylinders, wherein the second connector defines a substantially complete barrier between the second ends of the inner and outer cylinders, and wherein the third connector defines a substantially complete barrier between the inner and outer cylinders.

15. The magnetostrictive fluid-pressure sensor of claim 14, wherein each of the inner and outer cylinders is a magnetostrictive cylinder.

16. A method for determining a pressure of a fluid using the magnetostrictive fluid-pressure sensor of claim 15, comprising the steps of:
   a) exposing the fluid inlet to the fluid wherein the fluid enters the bore and contacts the first portion of the first connector;
   b) measuring an inductance of the first and second coils; and
   c) determining the pressure of the fluid using at least the measured inductance of the first and second coils.

17. A magnetostrictive fluid-pressure sensor comprising:
   a) an annular inner cylinder having a longitudinal axis, surrounding a fluid-receiving bore, and having first and second ends;
   b) an annular outer cylinder substantially coaxially aligned with the inner cylinder, spaced radially outward from the inner cylinder, and having first and second ends, wherein at least one of the inner and outer cylinders is a magnetostrictive cylinder;

c) an annular first connector connecting the first ends of the inner and outer cylinders and having a first portion extending radially inward of the inner cylinder and surrounding a fluid outlet of the bore;
d) an annular second connector connecting the second ends of the inner and outer cylinders and having a second portion extending radially inward of the inner cylinder and surrounding a fluid inlet of the bore;
e) an annular third connector connecting the inner and outer cylinders and disposed longitudinally between and longitudinally spaced apart from the first and second connectors;
f) a first coil surrounding the fluid-receiving bore, disposed radially between the inner and outer cylinders and longitudinally between the first and third connectors, and substantially coaxially aligned with the longitudinal axis, wherein the first coil when activated generates a solid first magnetic flux circuit in connecting portions of the inner and outer cylinders and the first and third connectors; and
g) a second coil surrounding the fluid-receiving bore, disposed radially between the inner and outer cylinders and longitudinally between the second and third connectors, and substantially coaxially aligned with the longitudinal axis, wherein the second coil when activated generates a solid second magnetic flux circuit in connecting portions of the inner and outer cylinders and the second and third connectors, and wherein the second magnetic flux circuit is opposite in flux direction to the first magnetic flux circuit in the third connector.

18. The magnetostrictive fluid-pressure sensor of claim 17, wherein the first connector defines a substantially complete barrier between the first ends of the inner and outer cylinders, wherein the second connector defines a substantially complete barrier between the second ends of the inner and outer cylinders, and wherein the third connector defines a substantially complete barrier between the inner and outer cylinders.

19. The magnetostrictive fluid-pressure sensor of claim 18, wherein each of the inner and outer cylinders is a magnetostrictive cylinder.

20. A method for determining a pressure of a fluid using the magnetostrictive fluid-pressure sensor of claim 19, comprising the steps of:
a) exposing the fluid inlet to the fluid wherein the fluid enters the bore at the fluid inlet and exits the bore at the fluid outlet, and wherein the fluid contacts within the bore the first portion of the first connector and the second portion of the second connector;
b) measuring an inductance of the first and second coils; and
c) determining the pressure of the fluid using at least the measured inductance of the first and second coils.

* * * * *